No. 713,317. Patented Nov. 11, 1902.
C. P. LAWSHE.
PRESS FOR GLASS TILES.
(Application filed Apr. 24, 1902.)

(No Model.) 3 Sheets—Sheet 1.

Witnesses: Inventor: Charles P. Lawshe
by Francis C. Lowthorp
Attorney

THE NORRIS PETERS CO., PHOTO-LITHO., WASHINGTON, D. C.

No. 713,317. Patented Nov. 11, 1902.
C. P. LAWSHE.
PRESS FOR GLASS TILES.
(Application filed Apr. 24, 1902.)
(No Model.) 3 Sheets—Sheet 2.

Witnesses:
Inventor:
Charles P. Lawshe
by Francis C. Lanthorp
Attorney.

No. 713,317. Patented Nov. 11, 1902.
C. P. LAWSHE.
PRESS FOR GLASS TILES.
(Application filed Apr. 24, 1902.)

(No Model.) 3 Sheets—Sheet 3.

UNITED STATES PATENT OFFICE.

CHARLES P. LAWSHE, OF TRENTON, NEW JERSEY.

PRESS FOR GLASS TILES.

SPECIFICATION forming part of Letters Patent No. 713,317, dated November 11, 1902.

Application filed April 24, 1902. Serial No. 104,428. (No model.)

*To all whom it may concern:*

Be it known that I, CHARLES P. LAWSHE, a citizen of the United States, residing in Trenton, in the county of Mercer and State of New Jersey, have invented certain new and useful Improvements in Presses for Glass Tiles, of which the following is a specification.

My invention relates to presses for glass tiles, and more especially to apparatus adapted to form tenons or keys on the tiles when the same are being pressed or molded into shape in the press.

Heretofore in the manufacture of glass tiles for wall-facing, &c., it has been found impracticable to form homogeneously with the tile-body while the same was being pressed into form an efficient key or tenon adapted to hold the tile firmly to the cement in which the same is embedded.

My present invention is adapted to produce a tile of pressed glass and simultaneously with the forming of the same to mold efficient tenons on the back side of the tile.

Figure 1:
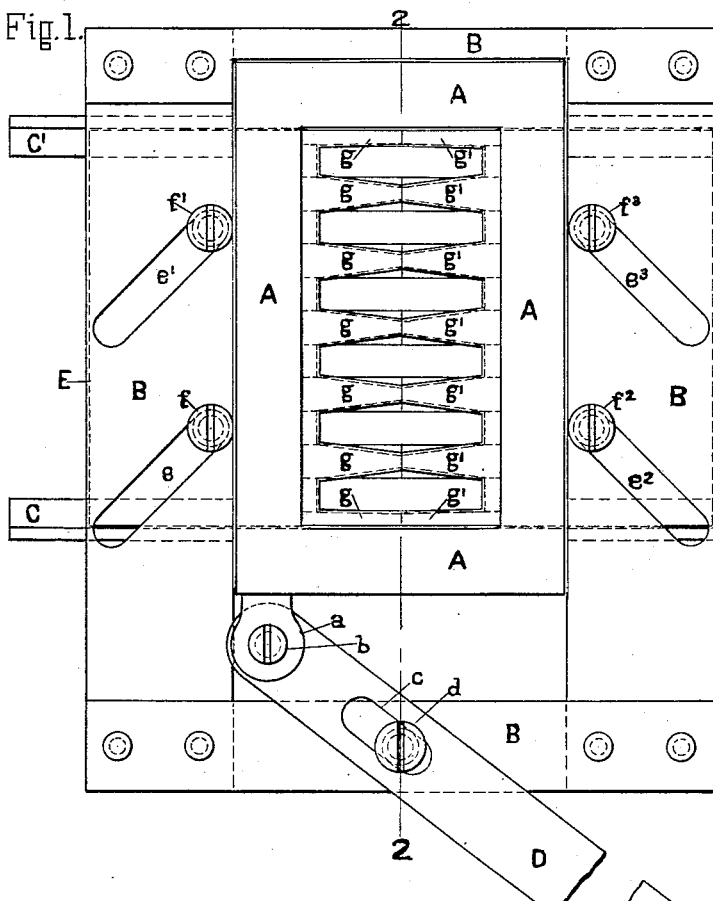
Figure 2:
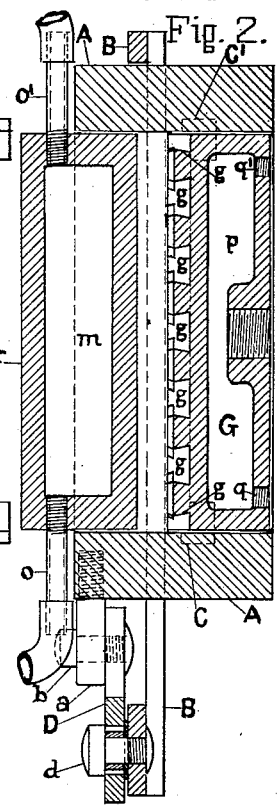
Figure 3:
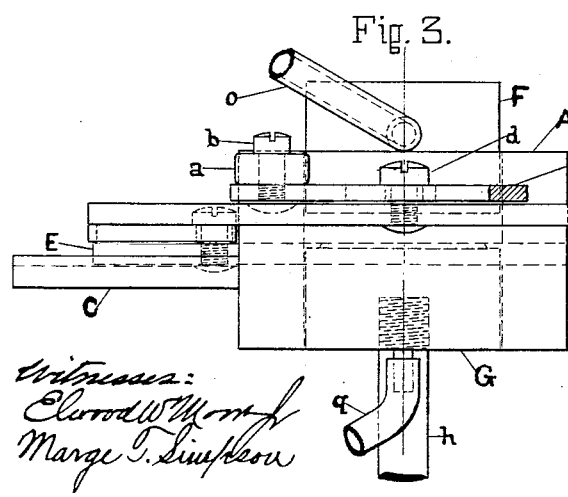
Figure 3:
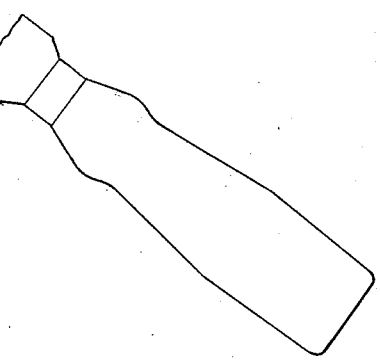
Figure 4:
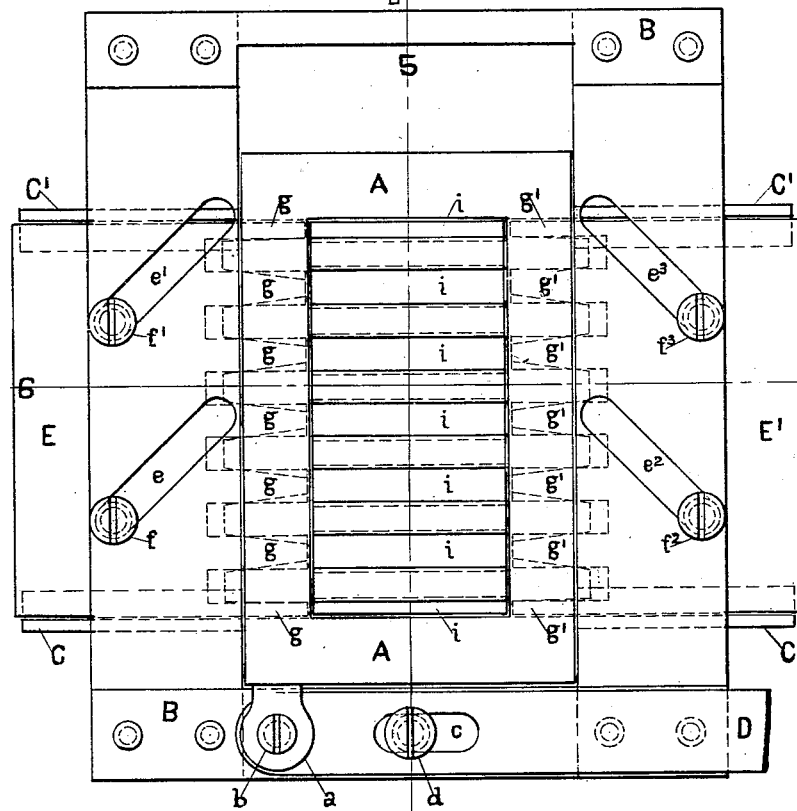
Figure 5:
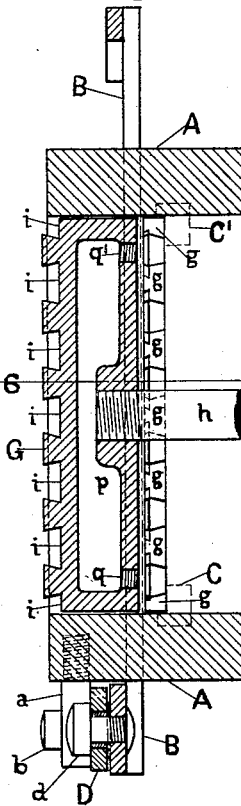
Figure 6:
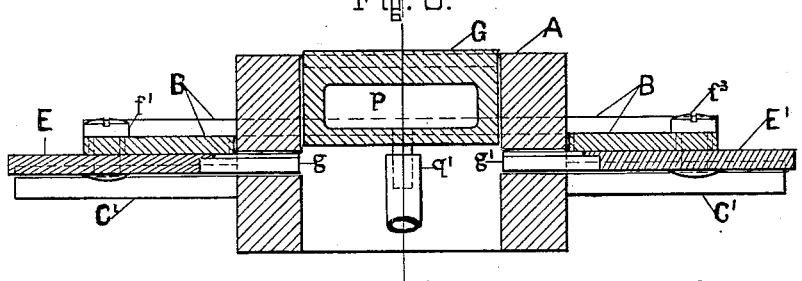
Figure 7:
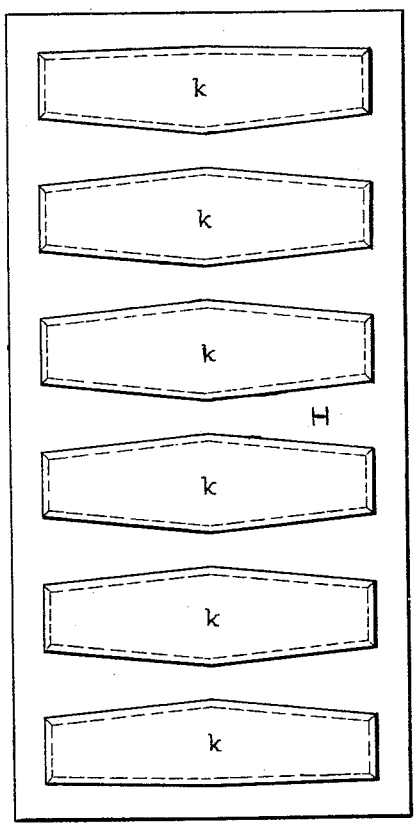
Figure 8:
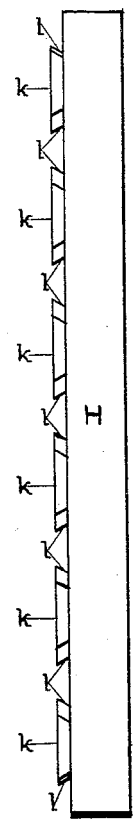
Figure 9:
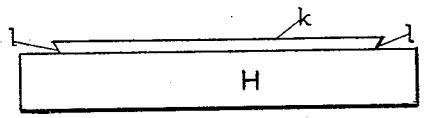

In the drawings forming a part of this specification, Figure 1 represents a plan view of my apparatus, showing the tenon-forming devices of the mold in position to perform their function. Fig. 2 shows a vertical longitudinal view of the apparatus, taken on the line 2 2 in Fig. 1 and showing the tenon-forming devices in the position in which they are illustrated in Fig. 1. Fig. 3 is an end view of the apparatus, showing the tenon-forming devices in the same position as in Fig. 1. Fig. 4 is a plan view of the apparatus shown in Fig. 1, but showing the tenon-forming devices removed from the interior of the mold. Fig. 5 is a vertical longitudinal view of the same, taken on the line 5 5 of Fig. 4, the tenon-forming devices being in the position indicated in Fig. 4; and Fig. 6 is a vertical cross-sectional view of the apparatus, taken on the line 6 6 of Fig. 4 and showing the tenon-forming devices in the position indicated in Fig. 4 and showing the lower platen or bottom of the mold thrown up, as in Figs. 4 and 5. Fig. 7 is a plan view of the back face of a glass tile such as my apparatus is designed to mold, the tile being shown on an enlarged scale. Fig. 8 is a side elevation of the tile shown in Fig. 7, disclosing in end view the tenons formed on the back face thereof; and Fig. 9 is an end view of the tile shown in Fig. 7.

In the drawings, A is the mold, which is firmly connected to a bench or stand intended to support the apparatus, but which is not shown in the drawings.

B is a metal frame which has a longitudinal motion relatively to the mold. This frame B is indirectly supported on the guides C C', which guides are firmly attached to the mold A. On the mold A is the ear $a$, upon which the lever D is swiveled by the bolt $b$. In the lever D is formed the slot $c$, in which plays the stud $d$, which stud is fixed to the frame B. By turning the lever D from left to right the frame B is slid or thrown into the position indicated in Fig. 4, and by moving said lever from right to left the frame may be returned to the position indicated in Fig. 1, the side walls of the mold A serving as guides for the frame. The said members of the frame B are provided, respectively, with the diagonal slots $e$ $e'$ $e^2$ $e^3$, in which play the studs or pins $f$ $f'$ $f^2$ $f^3$, respectively. The studs $f$ and $f'$ are fixed to a lateral sliding plate E, and the studs $f^2$ and $f^3$ are fixed to another lateral sliding plate E'. (See Figs. 4 and 6.) These lateral sliding plates E E' are supported by and move directly upon the guide C and C'. The plates E and E' are provided on their inner sides facing each other with series of tenon-forming devices $g$ and $g'$, which are shown in end view in Figs. 2 and 5 and in plan view in full lines in Fig. 1 and in broken lines in Fig. 4. These tenon-forming devices $g$ and $g'$ will be more fully described hereinafter.

F is the plunger or upper platen of the mold and is attached in any common manner to a lever or toggle-joint, which may be used to operate the same in the usual manner. Such operating apparatus is so well understood by those conversant with the art that I have not illustrated the same.

G is the lower platen or bottom of the mold and is adapted to be raised and lowered within the mold A by the use of a treadle or other common device, (not illustrated,) with which treadle or other operating device it is connected by the rod $h$, the rod $h$ being screwed into the bottom of the platen or otherwise connected therewith. When the molding operation is about to be begun, the platen G is in the position indicated in Figs. 2 and 3 and is supported upon the rod $h$, the stand upon which the apparatus rests, or upon a flanged projection formed upon the bottom of the mold A. The lower platen or movable bottom G of the mold A has formed transversely in its upper face the undercut grooves $i\ i$. (See Figs. 4 and 5.) These grooves $i\ i$ form guides for the lower and thicker portions of the tenon-forming devices $g\ g'$, and when the parts $g\ g'$ are in the position shown in Figs. 1 and 2 only the shallow undercut portions of the parts $g$ and $g'$ project above the upper face of the platen G. The object of thus constructing the undercut guides $i\ i$ in the platen G and the parts $g\ g'$, which reciprocate therein, is this: Glass tiles are preferably made quite thin, and they would not only be quite expensive to make, but would be more liable to fracture were the tenons formed upon their back faces made of greater thickness than the body of the tiles. The tenons of the tiles being preferably shallow, the device provided for molding them must be thin, or at least such parts thereof as actually effect the molding of the tenons. If, however, the tenon-forming devices be not made considerably heavier or ticker than it is desired to form the tenons of the tiles, they will quickly warp and become distorted and useless, owing to the heat of the glass which is placed in the mold. To obviate this difficulty, I form the lower portions of the parts $g\ g'$ so that they fit into and slide within the grooves $i\ i$ in the upper face of the platen G, and I thus make the tenon-forming devices of sufficient thickness to prevent their warping, and at the same time I am enabled to confine their motion to right lines.

In operating the molding apparatus the platen G stands in its normal position, as indicated in Figs. 2 and 3. The frame B is moved into the position indicated in Figs. 1 and 2, thus throwing the tenon-forming devices $g\ g'$ in the position indicated in Fig. 1, so that their outer ends contact and form in the bottom of the mold a series of undercut recesses, the upper face of the platen G forming the bottoms of such recesses and the shallow undercut portions of the tenon-forming devices $g\ g'$, projecting slightly above the upper face of the platen G, forming the side walls of such recesses. A sufficient quantity of glass is then gathered and placed within the mold A, and the platen F is forced down upon the same and compresses it, so that it fills every accessible part of the mold and enters into and fills the undercut recesses in the bottom of the mold. When the tile is fully formed, the plunger F is raised, the lever D is moved from left to right, thus withdrawing the tenon-forming devices $g\ g'$ from the interior of the mold, and the platen G is forced up into the position shown in Fig. 6, when the tile may be removed from the top of the platen G without injury or distortion. The tile thus produced is illustrated in Figs. 7, 8, and 9 of the drawings, in which H is the body of the tile, $k\ k$ are the tenons formed on the back thereof, and $l\ l$ are the undercuts formed on the sides of the tenons $k$.

To prevent undue heating of the apparatus while in use, and thus obviating the adhesion of the glass to the platens between which it is compressed, I form in the plunger F a chamber $m$ and connect with the chamber $m$ the pipes $o\ o'$. To one of these pipes may be connected a flexible tubing of any kind extending to an air pump or receptacle for compressed air. I likewise form a chamber $p$ in the plunger G, in which are the openings $q\ q'$, with which are connected short pipes, to one of which I attach a flexible tubing extending to the said air pump or receptacle. By means of this arrangement I am enabled to pass a constant current of cold air through the plunger F and the platen G, thus preventing adhesion of the glass to the apparatus during the process of molding.

Having thus described my invention, what I claim is—

1. In a glass-tile press, the combination of a mold, platens adapted to operate within said mold, the lower of said platens having guide-grooves formed in its upper face, forming devices adapted to be projected laterally within said mold and to reciprocate in said guides, and means for operating said forming devices.

2. In a glass-tile press, the combination of a mold, platens adapted to operate within said mold, the lower of said platens having guide-grooves formed in its upper face, laterally-reciprocating forming devices adapted to be projected within said mold and to move in said guides, and means, consisting of a slotted frame, connecting-studs and a lever, for operating said forming devices.

3. In a glass-tile press, the combination of a mold, chambered platens adapted to operate within said mold, the lower of said platens having guide-grooves formed in its upper face, and laterally-movable forming devices adapted to be projected within said mold and to move in said guides.

CHARLES P. LAWSHE.

Witnesses:
 MARGE T. SIMPSON,
 ELWOOD W. MOORE, Jr.